United States Patent Office 2,762,703
Patented Sept. 11, 1956

2,762,703

PROCESSES FOR TREATING MATERIALS CONTAINING NICKEL AND IRON

Edgar B. Mancke, Bethlehem, Pa., assignor to Bethlehem Steel Company, a corporation of Pennsylvania No Drawing. Application December 23, 1953, Serial No. 400,143

4 Claims. (Cl. 75—101)

This application is a continuation-in-part of my co-pending application, Serial No. 274,055, filed February 28, 1952.

My invention is directed primarily to processes for separating nickel and iron in materials which contain these two elements. My invention is also directed to the treatment of materials containing nickel and iron and which contain other elements such as chromium and cobalt for the purpose of separating these other elements as well as nickel from the iron.

Nickel is associated with iron in many materials. Many ores, for example, contain both of these elements. An object of my invention is to recover nickel from these materials.

An especially important object of my invention is the removal of nickel, or nickel and other non-ferrous metals such as cobalt and chromium, from iron ores to produce an iron product which can be used commercially in the manufacture of iron and steel. While nickel is a valuable constituent of many special steels it is not desirable in any considerable amounts in most of the commercial steels. In large tonnages of steel, in fact, it is usually desired to have the nickel content sufficiently low so that the nickel will have no substantial effects upon the properties of the steel. It is very important to keep the nickel content of the ore as low as practicable when such ore is to be used in making "hot metal" or "pig iron" for the manufacture of steel, in view of the fact that much of the scrap which is used in making steel already contains some nickel. Unless care is taken to use ore which is low in nickel content when making the hot metal or pig iron the nickel content of the hot metal or pig iron together with the nickel of the scrap can easily cause the nickel content of the finished steel to be above permissible tolerances.

It is a special object of my invention to remove nickel from iron ores which have hitherto offered great difficulty in treatment to render them available for use in general iron and steel manufacture. An example of such ores are the so-called Mayari type iron ores. In the disclosure of my invention I shall refer to the treatment of Mayari type iron ores for the purpose of setting forth the conditions and principles of the processes which are involved in my invention.

In Cuba there are very large deposits of these Mayari type iron ores. They have high iron contents and therefore should be very valuable as a source of iron in the manufacture of iron and steel. As yet, however, these ores have not been utilized except for certain limited purposes because of the fact that heretofore there has been no effective and economical method devised for the removal of nickel therefrom. Other substances beside nickel are present in Mayari ores which should be removed to render the ores fully effective for use in the manufacture of iron and steel, such as chromium, aluminum, and cobalt. The primary difficulty, however, is that of removing nickel. These ores contain nickel in such an amount and in such a condition as have heretofore prevented them being commercially beneficiated for use in the general manufacture of iron and steel. This difficulty in lowering nickel to the necessary extent is primarily due to the fact that a substantial part of the nickel is in such a state or is so bound to or combined with the other constitcents of the ore as not to be easily removed from the ore to bring the nickel content down to a sufficiently low figure.

Among the best known Mayari type iron ores are the so-called Mayari ores. Mayari ores as they occur in nature contain considerable "free water" and also a substantial amount of "combined water." Analyses of the calcined ores vary considerably but in general they run within ranges approximately as follows:

|  | Percent | Percent |
|---|---|---|
| Fe | 54 |  |
| Ni | 1.0 | 0.25 to 1.56. |
| Cr | 2.2 | 2.0 to 2.7. |
| Co | 0.15 | 0.05 to 0.35. |
| Mn | 0.5 | 0.24 to 1.76. |
| SiO$_2$ | 5.0 | 1.6 to 7.0. |
| Al$_2$O$_3$ | 10.0 | 6.0 to 14.0. |

In this table of analyses, the first column indicates the constituents of the ore; the second column indicates an average analysis; and the remainder of the table indicates the ranges. When, in this specification, I refer to Mayari type ores I mean those ores which, like the Mayari ores, have a considerable content of iron and contain nickel in a substantially lesser amount but still in an amount too great for general iron and steel making, and in which ores the nickel is difficult to reduce to the necessarily small amounts required for general iron and steel making.

My invention comprises the steps of mixing the material containing nickel and iron or nickel, cobalt and iron with an aqueous solution of nitric acid, subjecting compounds of such mixture to high temperatures and pressures in an autoclave to produce an aqueous solution of nickel nitrate or nickel and cobalt nitrates and obtaining iron in the solid phase, and separating the solution from the iron.

My invention is based, in part, on my discovery that ferric nitrate in unstable in aqueous solution under certain conditions and forms nitric acid and ferric oxide, which latter is insoluble and is precipitated, whereas nickel nitrate and cobalt nitrate in aqueous solution and under the same conditions are essentially stable and remain in solution. The conditions which produce this difference of stability of ferric and nickel nitrates may be indicated as follows. When an aqueous solution of ferric nitrate and free nitric acid is autoclaved at certain high temperatures the ferric nitrate forms nitric acid, which remains in solution, and ferric oxide which is precipitated. When an aqueous solution of nickel nitrate and free nitric acid is autoclaved at the same temperatures the nickel nitrate is unaffected and remains in solution. The discovery of the fact that there are temperatures at which ferric nitrate in aqueous solution containing free nitric acid is unstable but at which temperatures nickel nitrate under the same conditions is stable has two significant aspects as regards my invention. Where in this disclosure I refer to ferric oxide being formed and precipitated I desire the expression "ferric oxide" to cover not only ferric oxide itself but hydrated ferric oxide or ferric hydroxide as under varying conditions of operation either of these compounds may be formed.

One aspect of this discovery is the fact that when an aqueous solution containing free nitric acid and ferric and nickel nitrates is heated in an autoclave to temperatures where the ferric nitrate is unstable but the nickel nitrate is stable there results the precipitation of ferric oxide but the nickel nitrate remains in solution thereby permitting of the separation of iron and nickel by removing the nickel nitrate solution from the precipitated iron product. Another aspect is the fact that when a material containing nickel and iron is heated in an autoclave with an aqueous solution of nitric acid to those temperatures where ferric nitrate is unstable but where nickel nitrate is stable the nickel of the material forms nickel nitrate and goes into solution, while the major part of the iron is undissolved. Of course, there is the theoretical possibility in this case that the iron may first form ferric nitrate but, if so, the ferric nitrate because of its instability under the conditions forms ferric oxide and nitric acid and therefore, in effect at least, it is as if the iron in the material were unaffected by the nitric acid.

My invention comprises two main modes of procedure for separating nickel from iron, these two modes corresponding to the two aspects of my discovery outlined above. In one of these modes of procedure the material containing nickel and iron is subjected to the action of an aqueous solution of nitric acid for a sufficient time to dissolve the major part of both the nickel and iron as nickel and ferric nitrates. If the material being treated contains constituents of other elements which form soluble nitrates, these elements will also form nitrates which go into solution. A quantity of nitric acid solution will be employed sufficient to provide contained nitric acid to nitrate the major part of the iron, nickel, and other nitrate forming constituents. The solution containing the nitrate is separated from the undissolved residue and autoclaved at a temperature at which the ferric nitrate is unstable but at which temperature nickel nitrate is substantially stable. As result of this treatment of the ferric nitrate in solution nitric acid and ferric oxide are formed the latter being precipitated. The nickel nitrate, being stable under the conditions given, is unaffected and remains in solution as nickel nitrate. The solution containing nitric acid and nickel nitrate is then separated from the iron bearing residue. For purposes of convenience I shall hereafter refer to this mode of procedure as the "N–1 process." The claims of the present application are directed to this "N–1 process."

In the second main mode of procedure, the material containing nickel and iron is mixed with an aqueous solution of nitric acid, the amount of solution employed being such that the contained nitric acid is at least sufficient to meet the stoichiometric requirements of the nickel and other non-ferrous nitrate forming constituents of the material in their conversion into nitrates but insufficient to meet such requirements and also to nitrate a major portion of the iron in the material. The mixture is then autoclaved at a temperature at which ferric nitrate is unstable but at which nickel nitrate is essentially stable. Under these conditions the nickel is dissolved as nickel nitrate. The major part of the iron, however, remains undissolved in the material being treated. Following the autoclaving operation the solution containing nickel nitrate is separated from the iron bearing residue. For purposes of convenience I refer to this mode of procedure as the "N–2 process." Claims directed to this "N–2 process" are contained in my application Serial No. 274,055, filed February 28, 1952, referred to above.

I shall now give a specific description of an embodiment of the first of the two modes of procedure, namely what I have designated above as the N–1 process. In this specific example, Mayari ore is first dried. It is then ground to −65 mesh. Most of this Mayari ore is finer than −65 but the grinding operation reduces the coarser parts of the ore to a sufficient fineness for further treatment. The ore is then roasted in air at about 800° F. My process is effective without this type of roast but I prefer to employ it as it removes most of the water remaining in the ore and it improves the subsequent extraction of iron from the ore and improves the washing characteristics of the ore during subsequent treatment.

The ore is then mixed with a solution of nitric acid of 25% concentration at 200° F. to dissolve the major part of the iron, nickel and cobalt. The quantity of acid used is such as to be somewhat in excess of the amount which theoretically would dissolve all the iron, nickel, cobalt, manganese and aluminum and part of the chromium in the ore.

The solution thus produced is separated from the undissolved residue and pumped into an autoclave which is heated with saturated steam, 400 p. s. i. gage, which is fed directly into an autoclave to heat the contents to a temperature of 400° F. In this specific example of my process the autoclaving operation is continuous, i. e. the solution is fed continuously into a lower part of the autoclave and discharged continuously from an upper part of the autoclave. The rate of flow of solution into the autoclave and the rate of discharge therefrom are such that the average detention time of material in the autoclave is 68 minutes in this specific example. The contents of the autoclave are continuously agitated during its operation. This treatment in the autoclave effects the precipitation of the major part of the iron in the solution and also about half of the chromium of the solution as oxides. The solution contains most of the nickel as well as other non-ferrous materials as well as some free nitric acid. The solution and precipitated product are separated, and the precipitated product thoroughly washed. The solution, after its separation from the autoclave, is evaporated somewhat and about three-fourths of it mixed with free nitric acid solution and used for the treatment of more ore, and about one-fourth of the solution is pumped to the acid and by-product recovery plant where the nickel and other valuable constituents may be recovered in any suitable manner.

The precipitated iron bearing product is very low in nickel, the amount present being about 0.01%. A sample of the material after being calcined, will analyze substantially as follows:

| | Percent |
|---|---|
| Fe | 67.8 |
| Ni | 0.01 |
| Cr | 1.0 |
| Co | 0.01 |
| Mn | less than 0.10 |
| SiO$_2$ | less than 0.20 |
| Al$_2$O$_3$ | less than 0.20 |

In the just mentioned example of my invention, the conditions are set forth specifically. The various conditions may vary over considerable ranges and yet come within the scope of my invention. In dissolving the major part of the iron, nickel, manganese, aluminum and cobalt and part of the chromium in the ore prior to autoclaving, the concentration of nitric acid is not critical. The concentrations may vary from 10% to 70% although I prefer a concentration of not over 60%. The amount of acid used may vary considerably but I prefer to use somewhat in excess of the amount of acid which theoretically would be required to combine with all the iron, nickel, cobalt, manganese and aluminum in the ore. The temperature of the acid when being used to dissolve the iron, nickel and cobalt is not critical. Preferably it is at least 100° F. and may be as high as the boiling point.

The temperature of autoclaving may vary from 365° F. to 650° F. For the most rapid precipitation of iron it is desirable to employ temperatures from 385° F. and up. Moreover, the higher temperatures increase the yield of iron, other conditions being the same. The time for autoclaving may vary considerably although the longer periods of time tend to give a more complete precipitation of iron.

In the specific example given above, the autoclaving treatment is "continuous." While I prefer the continuous method for manipulative and economic reasons my process is fully effective chemically when a batch method is employed. By the "batch" method I mean that method of procedure whereby the autoclave is charged with a material to be treated, autoclaved and then discharged, following which another batch may be charged and treated, and so on. In general I find that the batch method requires a somewhat lesser time of stay in the autoclave than the average detention time required in the continuous method to give the same results.

In the specific example given above of the "N-1 process" the analysis of the iron product obtained shows a chromium content of 1.0%. This content is somewhat higher than is desired in iron bearing material for making many kinds of steels. The "N-1 process" may advantageously be combined with treatment for removing chromium. An example for producing an iron product low in nickel, cobalt and chromium follows.

Mayari ore is mixed with soda ash, using 80 parts of soda ash per 100 parts of contained calcined ore. This mixture is roasted at a temperature of from 1700° F. to 1900° F. for one hour. The roasted product is then treated with water to remove the soluble parts thereof. The roasting of the Mayari ore and the subsequent extraction of soluble matter by means of water reduces the content of the chromium to a very low figure; in this specific example the chromium content is reduced to less than 0.10%. This treatment also removes most of the alumina.

The treated product, low in alumina and chromium but still containing practically all of the nickel and cobalt of the original ore is now subjected to the "N-1 process" to obtain an iron containing product in which the nickel and cobalt is reduced to the desired degree. In practice it will be found that in the "N-1 process" less acid may be used than when ores are treated which have not been subjected to the chromium removing treatment. This is because of the fact that the removal of most of the alumina gives a product having considerably less material which can react with nitric acid to form soluble nitrates. In the specific example of treatment to remove chromium, given above, the reagent employed in the roasting step is soda ash (Na₂CO₃). Other substances are equivalents for the purpose of removing chromium. Any alkali may be used such as the carbonate, bicarbonate, hydroxide of sodium or potassium or mixtures of combinations of these compounds.

The amount of alkali to use should be at least such that the reagent is stoichiometrically equivalent to the aluminum and chromium contained in the ore. In practice I prefer to use in excess of this amount. In the specific example given above the amount employed is considerably in excess of the stoichiometric requirements of the aluminum and chromium.

I have found that the use of the roast with alkali followed by the subsequent removal of soluble matter by means of water not only greatly reduces the content of chromium but it also changes the nature of the ore in such a way that it is more readily acted upon by nitric acid in the "N-1 process."

I claim:

1. A process of treating iron ore containing nickel, comprising the steps of mixing the material with an aqueous solution of nitric acid in an amount at least sufficient to combine with the major portion of the iron and also combine with the non-ferrous constituents of the material capable of being dissolved by nitric acid, maintaining the acid and material in contact a sufficient period of time to dissolve the major portion of the iron and nickel of the material, separating the solution from the undissolved portion of the material, and autoclaving the solution at a temperature between 365° F. and 650° F. to obtain a solid phase containing iron and a solution containing the major portion of the nickel of the material.

2. A process of treating Mayari type iron ore containing nickel to produce an iron bearing product low in nickel and cobalt, comprising the steps of treating the ore with an aqueous solution of nitric acid of from 10% to 70% concentration, in amount at least sufficient to satisfy the stoichiometric requirements of the major part of the iron, nickel and other nitrate forming constituents of the ore, for a sufficient time to dissolve the major part of the iron, nickel and cobalt, separating the solution from the undissolved residue, subjecting the solution to autoclaving at a temperature of from 365° F. to 650° F. for a sufficient time to precipitate most of the iron, and separating the solution containing most of the nickel and cobalt from the precipitated product.

3. A process of treating Mayari type ore containing nickel to produce an iron bearing product low in nickel, comprising the steps of treating the ore with an aqueous solution of nitric acid of from 10% to 70% concentration, in amount at least sufficient to satisfy the stoichiometric requirements of the major part of the iron, nickel and other nitrate forming constituents of the ore, for a sufficient time to dissolve the major part of the iron, nickel and cobalt, separating the solution from the undissolved residue, subjecting the solution to autoclaving at a temperature of from 385° F. to 550° F. for a sufficient time to precipitate most of the dissolved iron, and separating the solution containing most of the nickel and cobalt from the precipitated product.

4. A process for treating Mayari type iron ore containing nickel to produce a product low in nickel, cobalt and chromium, comprising the steps of roasting the ore with alkali under oxidizing conditions, dissolving the soluble constituents with water and removing the solution from the roasted product, treating the product with an aqueous solution of nitric acid of from 10% to 70% concentration, in amount at least sufficient to satisfy the stoichiometric requirements of the major part of the iron, nickel and other nitrate forming constituents of the ore, for a sufficient time to dissolve the major part of the iron, nickel and cobalt, separating the solution from the undissolved residue, and subjecting the solution to autoclaving at a temperature of from 365° F. to 650° F. for a sufficient time to precipitate iron, and separating the solution containing nickel and cobalt from the precipitated product.

References Cited in the file of this patent

UNITED STATES PATENTS

| | | |
|---|---|---|
| 981,451 | McKechnie et al. | Jan. 10, 1911 |
| 1,590,525 | Kichline | June 29, 1926 |
| 2,643,204 | Mancke | June 23, 1953 |

FOREIGN PATENTS

| | | |
|---|---|---|
| 853 | Great Britain | of 1877 |
| 188,865 | Great Britain | Nov. 23, 1922 |
| 386,288 | Great Britain | 1933 |

OTHER REFERENCES

Report of Investigations 3626, March 1942. "Manganese Investigations." Published by Bureau of Mines, Washington, D. C. Entire report is relied upon and has 30 pages and 7 figures. Pages 4, 5, 6, 7, 10, 11, 15, 24 and 26 pertinent.